United States Patent [19]
Ficht et al.

[11] Patent Number: 4,782,801
[45] Date of Patent: Nov. 8, 1988

[54] INTERNAL COMBUSTION MOTOR

[75] Inventors: Reinhold Ficht, Kirchseeon; Franz Sinseder, Dorfen; Andreas Baumueller, Munich, all of Fed. Rep. of Germany

[73] Assignee: Ficht GmbH, Kirchseeon, Fed. Rep. of Germany

[21] Appl. No.: 927,770

[22] Filed: Nov. 6, 1986

[30] Foreign Application Priority Data

Nov. 14, 1985 [DE] Fed. Rep. of Germany ....... 3540441

[51] Int. Cl.⁴ ............................................. F01L 7/00
[52] U.S. Cl. ......................... 123/190 BD; 123/190 E; 123/190 R
[58] Field of Search ...... 123/190 E, 190 BA, 190 BB, 123/190 BD, 190 R, 190 A

[56] References Cited

U.S. PATENT DOCUMENTS

| | | | |
|---|---|---|---|
| 1,187,343 | 6/1916 | Lane | 123/190 BD |
| 2,217,853 | 10/1940 | Baer | 123/190 E |
| 3,945,364 | 3/1976 | Cook | 123/190 BD |
| 3,990,423 | 11/1976 | Cross et al. | 123/190 BD |
| 4,606,309 | 8/1986 | Fayard | 123/190 BD |

FOREIGN PATENT DOCUMENTS 672954 5/1952 United Kingdom ........ 123/190 BD

*Primary Examiner*—Henry Bennett
*Attorney, Agent, or Firm*—Goodman & Teitelbaum

[57] ABSTRACT

The invention relates to an internal combustion motor, in particular a lift-piston motor with internal combustion and with cylinders arranged in-line, as well as with at least one rotating control element for the gas charge change processes, which is arranged between cylinder block and cylinder cover with an axis of rotation lying perpendicular to the cylinder axis and between two pivots extending rotation-axially presents a control body standing in fixed connection with the pivots, there being provided counter-surfaces in the cylinder head surrounding the control body and the pivots uniformly and each pivot being traversed by an axially extending gas channel, which goes over in each case into an elbow-shaped gas channel arranged in the control body, which channel emerges with an opening at the surface of the control body, and an arrangement being provided for the transfer of a rotary movement from the crankshaft to the control element, characterized in that the control body is constructed as a sphere, in particular as a hollow spherical body.

37 Claims, 11 Drawing Sheets

SECTION II-II

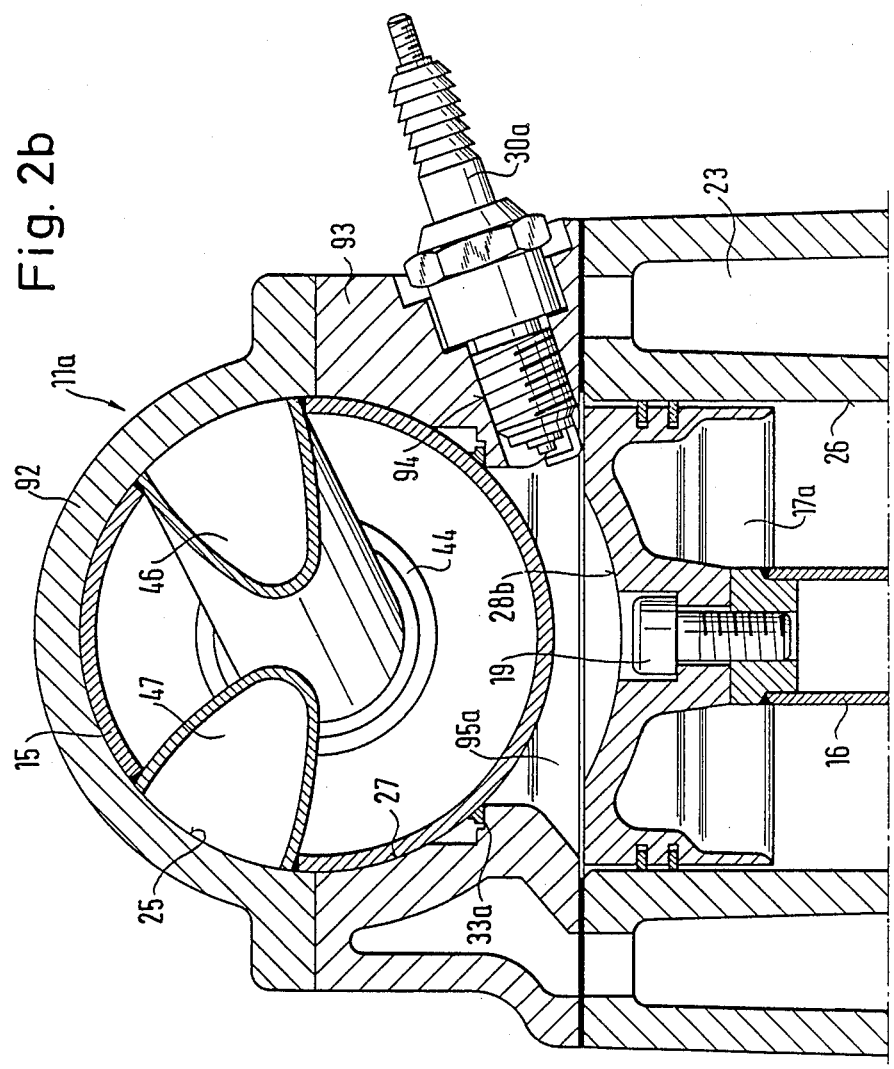

Fig. 6

| MOTOR TYPE | 2-VALVE-MOTOR | 4-VALVE-MOTOR | SPHERICAL ROTARY SLIDE VALVE MOTOR |
|---|---|---|---|
| MAX. OPENING CROSS SECTION [mm$^2$] | 731 | 790 | 920 |
| MAX. OPENING CROSS SECTION COMPARATIVE FIGURES [%] ⊗ | 100 | 108 | 126 |
| TIME CROSS SECTION [mm$^2$ °KW] | 66 480 | 102 030 | 149 960 |
| TIME CROSS SECTION COMPERATIVE FIGURES [%] ⊗ | 100 | 153 | 226 |

⊗ REFERENCE MAGNITUDE: 2-VALVE-MOTOR

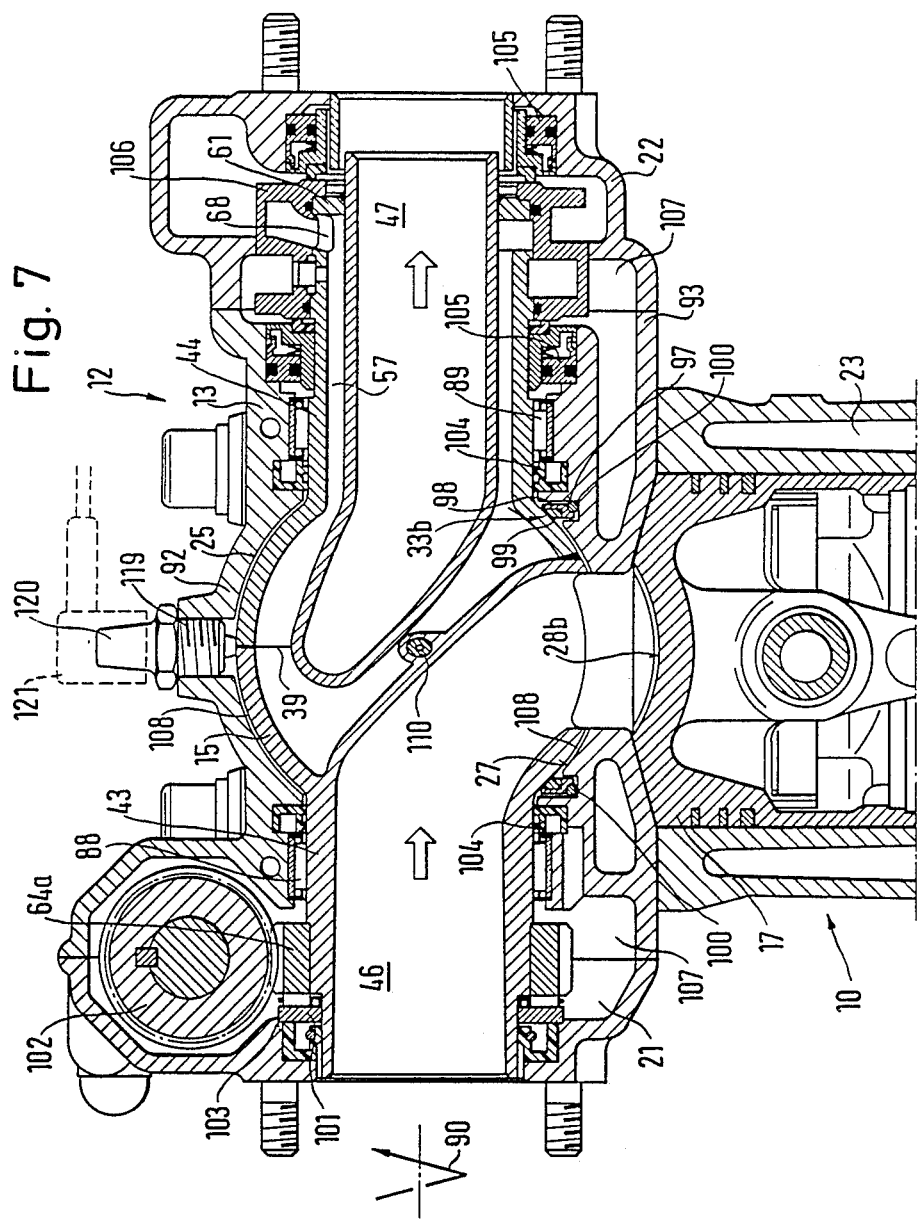

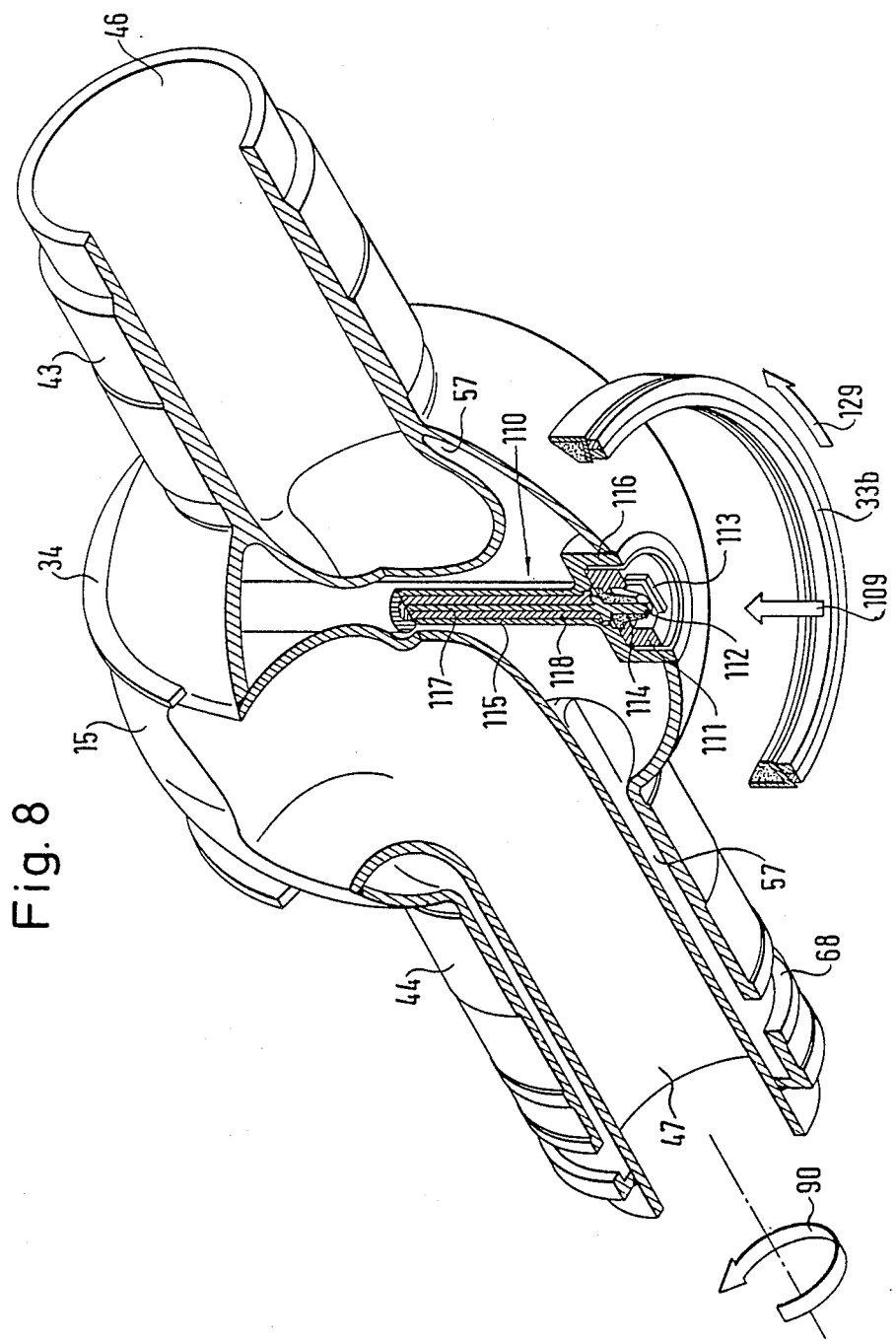

INTERNAL COMBUSTION MOTOR

The invention relates to an internal combustion motor, in particular a lift-piston motor with internal combustion and with cylinders arranged preferably in series, as well as with at least one rotating control element for the chase charge change processes, which is arranged between cylinder block and cylinder cover with an axis of rotation lying perpendicular to the cylinder axis and presents between two pivots extending rotationally axially a control body standing in fixed connection with the pivots, in which system there are provided in the cylinder head counter-surfaces uniformly surrounding the control body and the pivots and each pivot is traversed by an axially extending gas channel which goes over in each case into an elbow-form gas channel arranged in the control body, which channel emerges with an opening on the surface of the control body, and in which means are provided for the transfer of a rotary movement from the crankshaft to the control element.

Such a control element is known under the designation of roller rotary slide valve according to Cross, because between the pivots there is present a roller body into which there are introduced the two elbow-shaped gas channels. The bearing of the roller occurs in a divided cylinder head. There the cylinder is pressed by coil springs against the underside of the roller, in which there takes place a deflection of the fresh gases and exhaust gases through 90°. The fresh gas enters in axial direction and the exhaust gas exits in axial direction. The reaction forces between crankcase and piston surface are conducted through a yoke that engages outside the cylinder as an axial extension on the upper shell of the cylinder head. There is yielded from this a surface pressing between roller surface and upper shell, there being provided between the surfaces a sealing oil film.

Another roller rotary slide valve according to Baer is guided in an undivided cylinder head likewise slidably borne with an oil film between the roller surface and the roller counter-bearings. The gas channels in the roller are arranged in diametral direction. In axial direction the roller is flowed through for cooling by air or water. A movable cylinder bottom seals off against the combustion chamber with the aid of a multilayer steel membrane and presses against the roller. The resulting surface pressing assures, first of all, a low bias tension and therewith a sufficient sealing in the suction stroke. The combustion pressures then bring about the requisite increase of the contact pressure.

There are known a number of other rotary slide valves that are designed to replace the usual reciprocating plate valves. Plate valves guarantee, to be sure, a maximum degree of technical dependability, present a simple outer form, yield a generally problem-free sealing of the combustion chamber at combustion pressure and can be accommodated constructively relatively well in the optimization of the internal combustion motor, but the gas change control with plate valves prevents an optimization of processes of flow technology, especially the opening behavior (channel cross section), and an optimization of the combustion chamber, for which reasons many attempts have been undertaken to develop; rotary slide valves that could replace the reciprocating plate valves, because the rotary slide valves are constructively simpler and assure a better opening behavior.

In the known slide valve controls there are distinguished nonuniformly moved and uniformly moved slide valves. The nonuniformly moved slide valves yielded excessively high mechanical and thermal technical loads and, therefore, were not usable.

Uniformly moved slide valves are driven from the crankshaft and present a proportional turning behavior. They are not exposed, therefore, to any dynamic forces. Constructions have been worked out with different rotationally symmetrical forms of the control body.

A so-called spherical rotary slide valve control has been developed for a radial engine (Sklenar construction type). Opposite a fixed control ring that belongs to the supporting body of the motor, the radial arrangement of cylinders executes a movement that is used for the control of intake and outlet channels arranged in the control ring and for the transport of the cylinder head over the compression interval, ignition internal and working interval. The relatively narrow control ring is executed spherical on its inner surface. The cylinders carry sleeves which lie for the sealing against this annular surface under the influence of the centrifugal force and the combustion pressures. The face surfaces of the sealing sleeves correspond to cylindrical spherical segments. Because of these spherical elements the slide valve has been named a spherical rotary slide valve. Through the special form of the sealing surfaces it is achieved that the sleeve can execute, besides the axial displacement, a free turning about the cylinder axis. Hereby the cylinder sleeves automatically grind on the annular slide valve surface until there is formed an ideal sealing mirror. If foreign bodies pass onto the sealing surface, they are conveyed off by the sleeve rotation. The interior of the sealing sleeves presents with the favorable space between piston and cylinder bottom for the change turbulence the compression and combustion chamber. The ratio of volume to surface is favorable and approaches the ideal combustion space. Since the light-metal sealing sleeves that seal against the cylinder neck with boston rings, are alternately traversed by fresh gas and exhaust gas, they take on a relatively low temperature and retain their strength. The sealing on the spherical surface is still good when the fixed control ring through the forces acting on it no longer corresponds to the ideal spherical form. The comensation occurs then through corresponding axial displacement of the sleeves and shoes. The grinding-in of the sealing surface is an automatic process which continues when disturbances arise, for example, through foreign bodies.

A substantial disadvantage of this construction type is that it can be used only in motors in radial form.

A suggestion of Apfelbeck is to equip a roller-borne roller slide valve with spherical running track and to arrange this over the cylinder head. In order to achieve a rotation of sealing bodies, these should be set somewhat off-center. The slide valve could be rinsed with water. With this proposal it should be possible to avoid the disadvantageous friction of the slide valve on the closure cover in the flat-slide valve construction type (disk) and the resulting high consumption of oil. A realization of this suggestion has not occurred. Apfelbeck's proposal resumbles the embodiment of the roller slide valve according to baer with gas channels passing radially through the roller and axial traversability of the roller with a coolant. The roller is to present, moreover, a raised spherical segment, the spherical ring surface of which forms the running track of the roller and is to act against the sealing rings that are to be forced into rotation by the off-center bearing.

Although there are a large number of slide valve solutions for the gas change and the slide valves could assure many advantages over plate valves, so far no slide valve has been able seriously to displace the plate valve. The use of one or another slide, valve is technical possible, but requires such considerable modifications of the construction of the internal combustion motor, that the use cannot come in question. It is economically unjustifiable to change the other components of the internal combustion motor that are optimally designed and attuned to one another, and in particular harmonize with the construction of the plate valve control and to focus them on a slide valve control. Since all the component groups, such as crank drive, casing and gas-change control are attuned to one another, hitherto all attempts to alter the gas change control fundamentally in its manner of function have failed. Such an innovation of a component group of an internal combustion has hitherto required changing the entire concept of the internal combustion motor.

All slide valve constructions influence, like the plate valve constructions, the spatial form of the combustion chamber of the cylinder. The combustion chamber should be little fissured and, furthermore, its surface should be kept as small as possible, which problem cannot be optimally solved with a plate valve construction. Also, the position of the spark plug is essential. In the plate valves as well as in the known rotary slide valves, it should lie within a radius of about 20 mm about the bore axis of the cylinder.

In a slide valve control the sealing has an important role. Sealing elements are sought which can be made with low manufacturing tolerance and low expenditure in parts and in operation lap in as accurately as possible through their own movement with the slide valve. The known rotary slide valve constructions require complicated seals. This is another reason why the slide valve controls have not so far come into general use.

From the above analysis of the state of the art it is yielded that a slide valve control is technically feasible. The knowledge above the sealing and construction is present, so that it would not be necessary to make any restrictions of any kind in the construction of a motor. In respect to the quality of the change a rotary slide valve control, regardles of its construction type, offers clear advantages over the valve control. In view of the channel cross sections required in modern motor vehicle internal combustion engine construction the control elements of the slide valve controls take on forms and sizes which no longer permit the use of present motor concepts for the design of such a control. In in-line motors the slide valve size determines the cylinder spacing and therewith the structure size of the motor. The present slide valve concepts make it necessary to increase the spacing between the cylinders by at least 30%, for which reason the known slide valve constructions in today's state of the art and with the requirement for motors as compact as possible are at a disadvantage.

The problem of the invention is to make available a rotary slide valve that is producible simply, requires a very simple sealing element, makes possible an optimal combustion chamber formation and, in particular, is usable for in-line motors of usual construction type through replacement of the plate valve constructions.

This problem is solved in an internal combustion motor of the type described at the outset by the means that the control body is constructed as a sphere, in particular as a hollow spherical body, the pivots are executed as bearing pivots and are borne in the cylinder head, in the cylinder head there are provided cup-shaped counter-surfaces surrounding the control body, there being arranged in the cup surface adjoining the cylinder a sealing ring borne in particular obliquely to the cylinder axis, which lies against the surface of the spherical body and, in particular, through the rotary movement seals the combustion chamber against the outer space.

Through the equipping according to the invention of the slide valve controlling the gas change with a fully spherical body with control channels issuing into its bearing pivots there is created a functionally secure slide valve system that makes possible an operationally secure sealing of the combustion chamber and opens up the possibility of the direct cooling of the control members for the gas change system. A coolant entering the cooling channel between the first bearing pivot and the first control channel can flow through the interior of the spherical rotary slide valve, after which it can emerge, for example, over the cooling channel between the oppositely lying second bearing pivot and the second control channel. It is expedient to provide the cooling channel exclusively in the spherical body and in the gas-discharge side bearing pivot. Into the very accurately producible hollow spherical surfaces it is possible—if necessary—to install operatively securely functioning sealing strips, so that a sealing going beyond the usual degree is attainable in the combustion chamber in externally ignated internal combustion motors, the spherical domed form of the spherical rotary slide valve being especially well suited for the absorption of high pressure forces. Since the spherical rotary slide valve is driven over a gear rim mounted on a bearing pivot, the transfer of the rotary movement from the crankshaft onto the spherical rotary slide valve is especially simple, especially since there are neither spring forces to be over come nor uneven accerlations to be generated, as is the case with cam-controlled plate valves. The use of a solid spherical form for the rotary slide valve in conjunction with the connection of the cylinder head cover over the flange parts carrying the rotary bearing of the rotary slide valve with the cylinder block makes possible in a technically simple manner a relatively free formation and therewith optimation of the combustion chamber in the sense of a clean combustion of the gas present in each case in the combustion chamber. The piston presenting in consequence of the spherical form used of the rotary slide valve a corresponding cup shape on the face surface is fitted to the inner shell surface of the piston skirt of special thermal stress in such a way that despite the heat expansions occurring tiltings of the piston in the cylinder are avoided. This is especially advantageous when the construction according to the invention is applied to an internal combustion motor that presents two cylinder blocks opposite one another similarly to a double-piston engine arrangement and the pistons sliding in the cylinder are rigidly joined with one another over a crank loop. Finally, the construction according to the invention of the spherical rotary slide valve, especially the construction of the cross section form of its control channels, leads to a very favorable ratio of opening cross section to time cross section in comparison to internal combustion motors with gas changed controlled with plate valve. A further special advantage is yielded from the fact that with use of a hollow sphere the spark plug can be accommodated especially centered inside the hollow sphere.

The invention is described in the following with the aid of the examples of execution depicted in the drawing.

BRIEF DESCRIPTION OF DRAWINGS

FIG. 2b a section corresponding to FIG. 2 with a modified construction of the piston;

FIG. 6 a table from which there are to be seen the opening cross sections, time cross sections with the corresponding comparative numbers for four-cycle motors with various gas change systems for the intake;

FIG. 7 a section through another form of execution of the spherical rotary slide valve;

FIG. 8 a spatial representation of the spherical body, partly in section.

Figure 1:
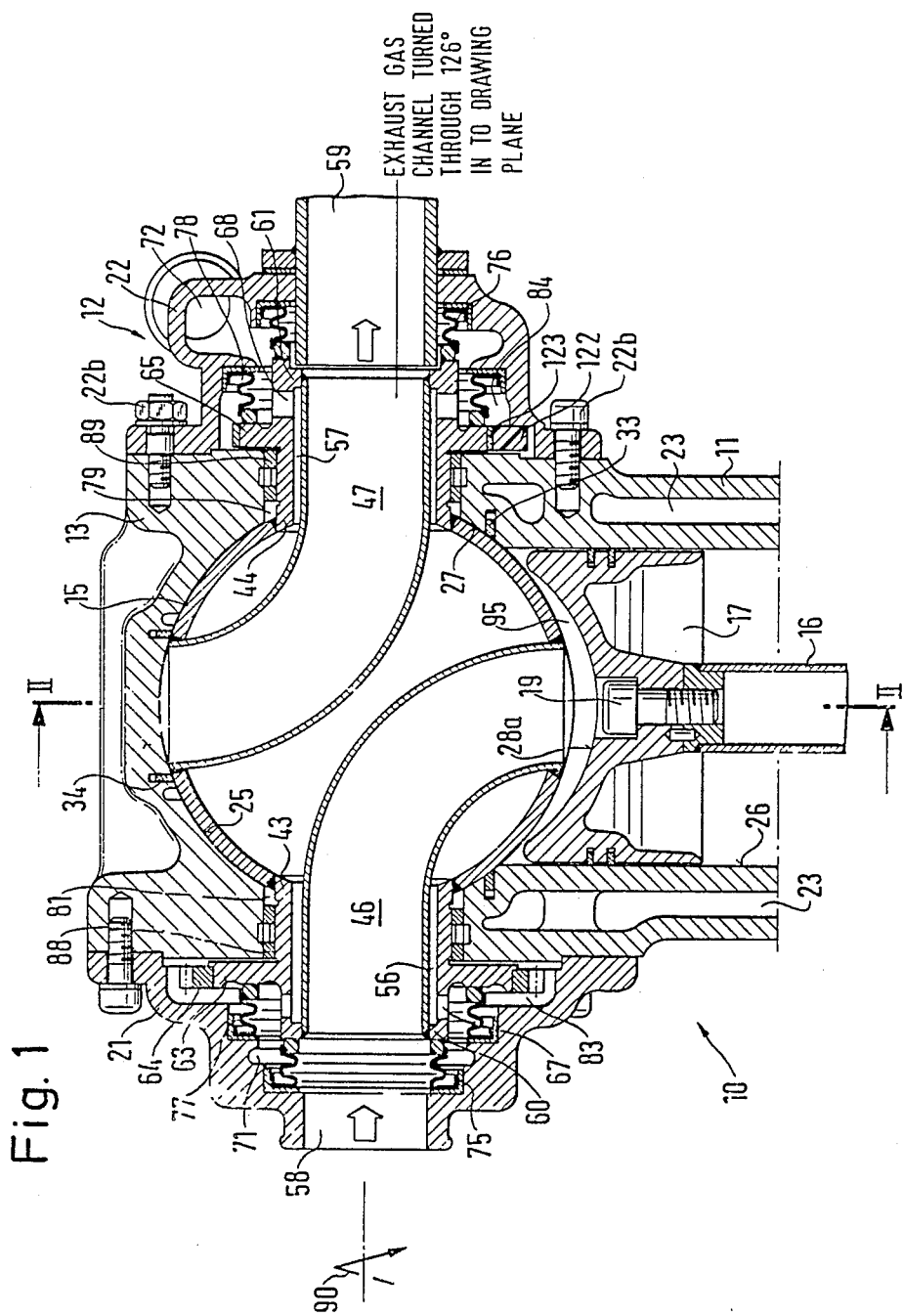
FIG. 1 shows a section through the cylinder head of an internal combustion motor with a rotary slide valve according to the invention serving for the gas change control in the intake position.

An internal combustion motor, designated as a whole with the reference number 10, only partially represented in FIG. 1, comprises a cylinder block 11, a cylinder cover 13 forming a part of a cylinder head 12, a spherical rotary slide valve 15 turnably borne between these, as well as a piston 17 fastened to a piston rod 16.

The crankcase bearing the cylinder block 11 is, in the interest of better perspicuity, not represented and, therefore, also omitted are the appertaining oppositely lying other cylinder block with cylinder head as well as the appertaining piston and the piston rod. Both cylinderblocks, therefore, are arranged in the manner of a double-piston motor, their pistons are connected with the ends of a rigid piston rod, which over a likewise not represented piston loop transform the reciprocating movement of the pistons into a rotary movement.

In FIG. 1, as already mentioned, there is represented only the piston 17, which is connected over a face-side screw 19 with the one end of the piston rod 16.

Figure 2:
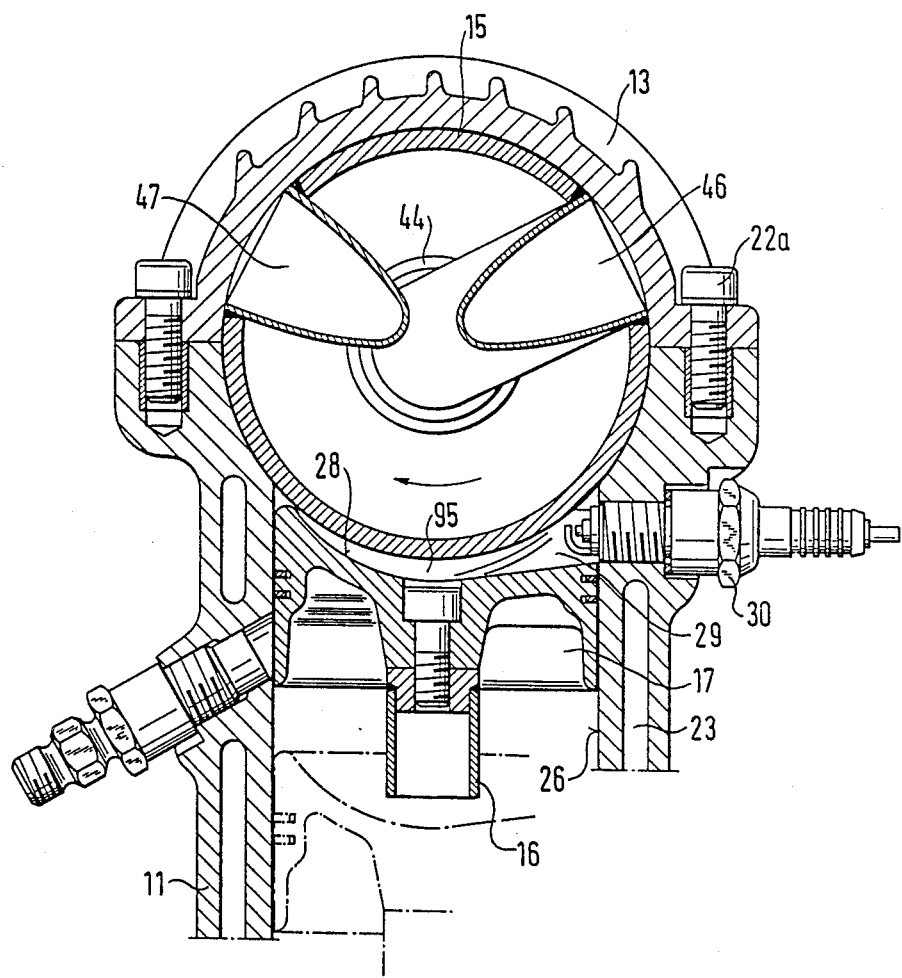
FIG. 2 a section along the line II—II in FIG. 1, in which the rotary slide valve is represented in the ignition position.

The cylinder cover 13, as FIGS. 1 and 2 show, is detachably join with the cylinder block 11 directly over clamping bolts 22a. The cylinder cover 13 presents on its inside with the exception of the entry zones of the pivots 43, 45 a cup-shaped or spherical dome-shaped counter-surface 25, while the cylinder block 11 in the zone of the upper end of the cylinder bore 26 on the inner edge with exception of the entry zones of the bearing pivots 43, 44 and the cylinder bore likewise a spherical dome-shaped counter-surface 27. In the cylinder block 11 there are provided cooling channels 23. Flange caps 21, 22, after the cylinder head cover 13 is joined with the cylinder block 11, are separately screwed on laterally (screws 22b) and exercise no carrying function with respect to the spherical rotary slide valve bearing and the pressure forces in the combustion process. The cover over in each case the bearing place for the slide valve that is arranged between the cylinder cover 13 and the cylinder block 11.

Figure 2A:
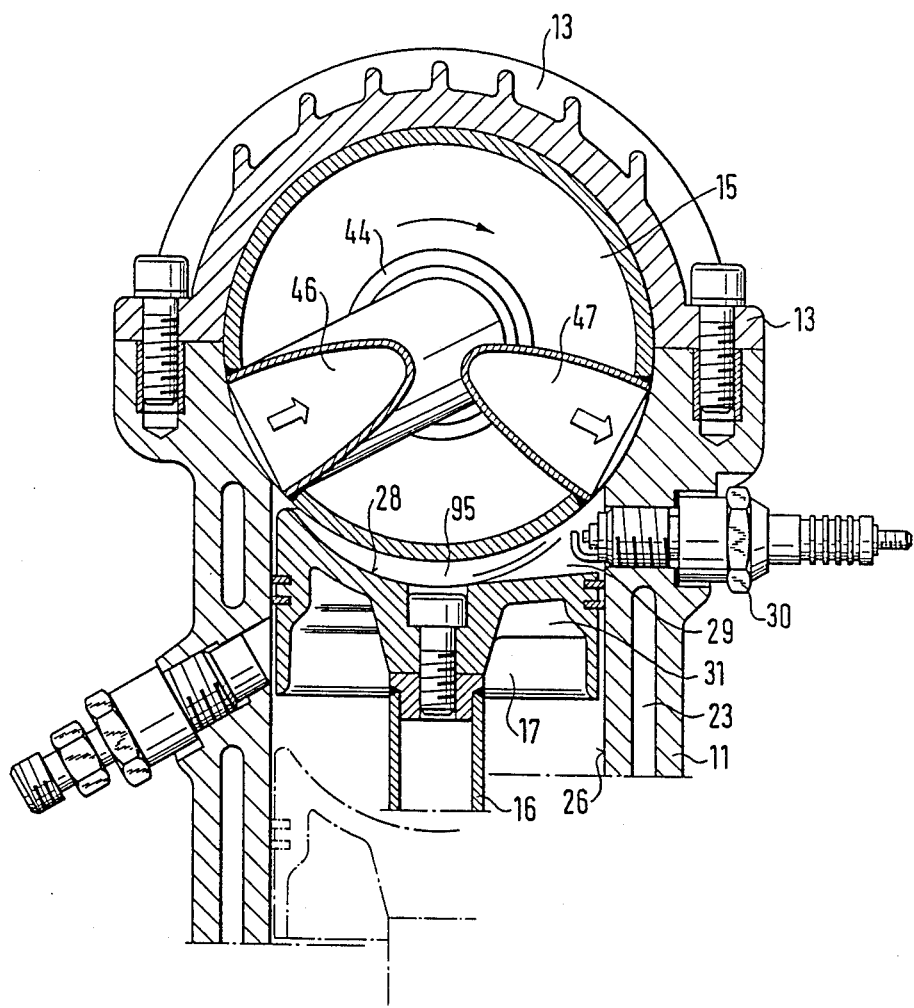
FIG. 2a a section corresponding to FIG. 2, but with the rotary slide valve in the gas change position—overlapping of the gas intake and outlet channel in the piston position OT.(upper dead point)
Figure 2C:
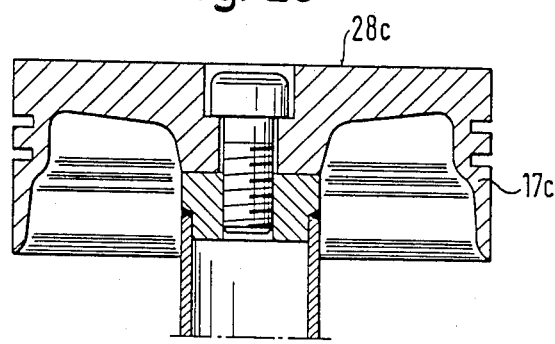
FIGS. 2c to 2e various modified constructions of the piston.
Figure 2D:
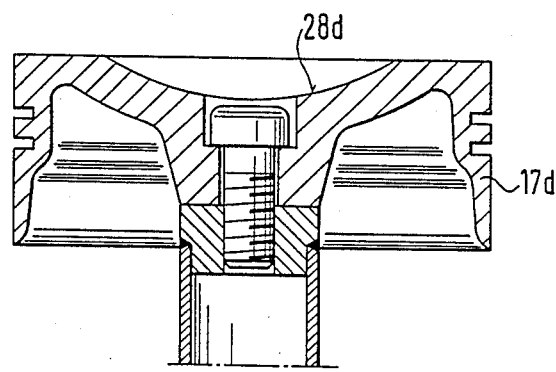
Figure 2E:
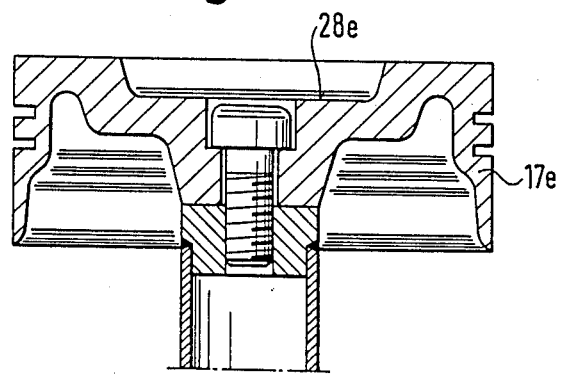
Figure 3:
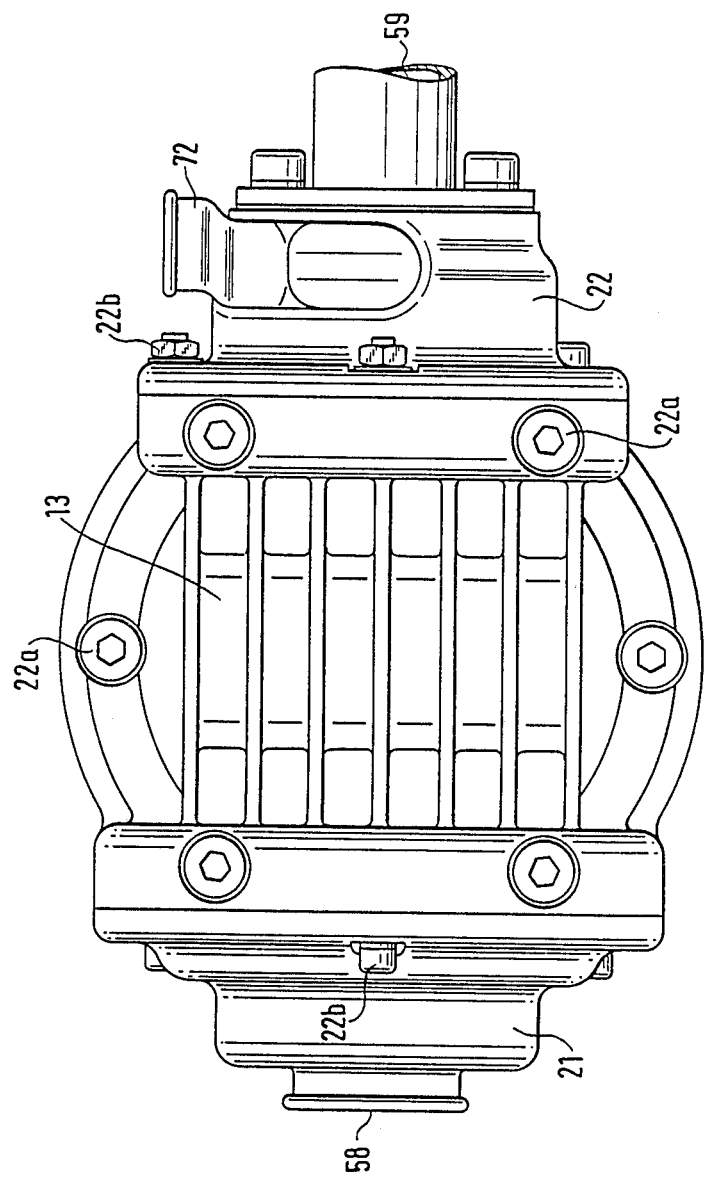
FIG. 3 a plan view of the cylinder head of the internal combustion motor according to FIG. 1.

Likewise, the piston 17 presents a spherical shell section-form face surface 28, into which there is introduced a radially extending groove 29, into which there extend the electrodes of a spark plug 30 radially screwed into the cylinder block; cf. FIG. 2. To the groove 29 there is allocated a cooling rib 31 lying inside the piston skirt (FIG. 2a). To the spherical surface or cup surface in the cylinder cover and also the spherical surface or cup surface in the cylinder block there are allocated sealing strips 33 and 34, of which the sealing strip 33 is constructed in annular form.

The piston 17 can, however, also as FIGS. 2b to 2e show, have a rotationally symmetric formation of its face surface 28, namely as a flat surface 28c, as a cup-shaped surface 28d with annular border and as truncated conical surface 28e with annular border. The spark plug 30a is then arranged according to the disposation according to FIG. 2b above the upper piston dead point.

Figure 4:
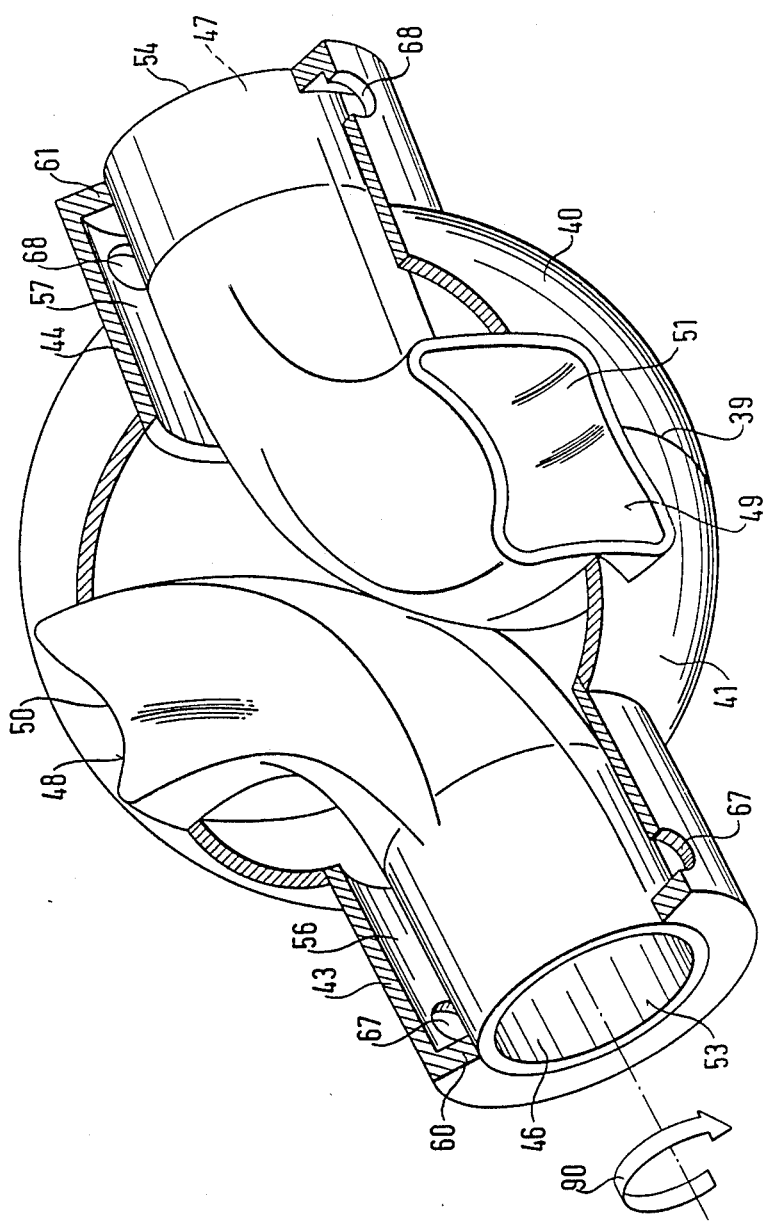
FIG. 4 a perspective partial section representation of the rotary slide valve and its control edges in enlarged representation.

With the aid of FIG. 4 there is described in the following the spatial form of an embodiment of the spherical rotary slide valve 15. It consists of two spherical half-shell parts 40 and 41 welded gas-tightly with one another, onto which in each case there is welded a tubular bearing pivot 43 centrally on sides lying opposite to one another. The parts 40 and 41 completing to a hollow sphere in the equatorially arranged separating seam 39 are traversed by two elbow-shaped control channels 46 and 47 in the manner represented in FIGS. 1, 2, 2a, 2b and 4, at a control angle of, for example, 126°—this control angle is to be attuned to the particular type of motor, it is on this that the control times and the overlapping angles depend, so that the ends 48 and 49 issue in closed linkage into openings 50 and 51 of parts 40, 41, while the other ends 53, 54 pass through the tubular bearing pivots 43 and 44 coaxially in such a manner that in each case there result cooling channels 56 bounded by the outer mantle surface of the control channel and the inner mantle surface of the bearing pivot; cf. also FIG. 1. As FIGS. 1 and 4 show in particular, the cross sections of the zones of the control channels 46 and 47 issuing in the openings 50 and 51, therefore into the combustion chamber—cylinder bore 26—are formed about rectangularly and the cross section of the zones of the control channels issuing into the intake and suction line 58 and 59 of the control channels are formed circular, in order to obtain a favorable ratio of opening cross section to time cross section for the gas change control, as is shown in detail in the diagram according to FIG. 5 in a manner still to be described.

The bearing pivot 43 presents on its free end away from the sphere a radially extending ring 60 and the bearing pivot 44 presents on the corresponding end a radially extending ring 61, with which in each case the allocated ends of the control channels 46 and 47 are welded gas-tight. The ends 48 and 49 are likewise welded gas-tight in the openings 51 and 52 of the parts 40 and 41.

The bearing pivot 43 presents further an annular projection 63 on its outer mantle surface extending radially outward with gear rim 64 fastened to it with radially extending teeth—gear FIG. 1—which is arranged outside the bearing opening 81 and over which there is driven in a manner not represented the spherical rotary slide valve 15 uniformly from the drive shaft (likewise not represented). The outer mantle surface of the other bearing pivot 44 likewise presents a flange ring-type radially extending, annular projection 65. The projection 65 is arranged outside the bearing opening 79 and lies with a slide ring or the like on the face surface of the cylinder cover 13 and of the cylinder block 11, whereby the rotary slide valve is axially fixed in place, because the drive is designed in such a way that it draws the flange ring 65 against the face surface. Both bearing pivots are radially traversed by several bores 67 and 68, so that the cooling channels 56 and 57 communicate over these bores with a coolant-conducting channel 71 and a cooland lead-off channel 72; cf. FIG. 1.

To the face sides of the bearing pivots 43 and 44 there are allocated in each case slide ring seals 75 and 76 in a manner known per se. Likewise slide ring seals 77 and 78 are allocated to the gear rim flange 63 and to the flange 65. These seals are borne in corresponding recesses in the flange caps 21, 22.

As is further to be perceived from FIG. 1, the spherical rotary slide valve 15 is borne by means of its bearing pivots 43 and 44 in cylindrical bearing openings 79 and 81 which in each case are half in the cylinder block 11 and half in the cylinder cover 13 in order to make possible the assembling of the spherical rotary slide valve. As already mentioned, the cylinder cover 13 is supported on the cylinder block 11; the flange caps 21 and 22 joined with both are provided with rotationally symmetrical or annular step-form recesses, for example 83 and 84, serving for the reception of the sealing, bearing and drive parts.

The spherical rotary slide valve 15 is turnably borne in bearing openings 79 and 81 of cylinder block and cylinder cover 13 with interposition of bearing shells 88 and 89. The slide ring seals 75 to 78 assure a secure sealing between the channels conducting the gas, the coolant and the lubricant.

In operation the spherical rotary slide valve 15 will be driven uniformly by the drive shaft (not represented) over transfer members (likewise not represented) that stand in engagement with the gear rim 64, in the direction of arrow 90, in such a way that over the control channels 46 and 47 first the gas inlet 58 and after compression and ignition of the injected mixture the gas outlet 59 communicates with the combustion chamber, therefore with the cylinder bore 26. In FIG. 1 there is to be see the rotary position of the spherical rotary slide valve, in which the gas intake is in communication with the combustion chamber, while in FIG. 2 the rotary position of the spherical rotary slide valve is shown in which there occurs the combustion of the injected mixture Finally, in FIG. 2a there is shown the rotary position of the spherical rotary slide valve in the gas-change position, in which the piston 17 is in its upper deadpoint position.

In the modified form of execution represented in FIG. 2b the cylinder cover is constructed in two parts, and, namely, it is subdivided into a spherical cupshaped cover upper part 92 and into a spherical cup annular cover lower part 93, which are screwed together gas-tight in common with the only partly represented cylinder block 11a in a manner not represented. The cover part 93 has an inclined, lateral, correspondingly offset threaded bore 94, into which there is screwed the spark plug 30a. The spark plug 30a extends with its ignition electrodes into a combustion chamber 95 situated above the cylinder bore 26, between the face surface 28b of the piston 17 and the spherical rotary slide valve 15. In this form of execution there is provided only one sealing ring 33a between spherical rotary valve and cylinder head in the annular cup surface of the cover lower part 93. Further there is eliminated the groove 29 in the face surface of the piston 17; this face surface can be formed rather according to FIGS. 2c to 2e, so that also the additional rib 31—cf. FIG. 2a—is omitted.

Figure 5:
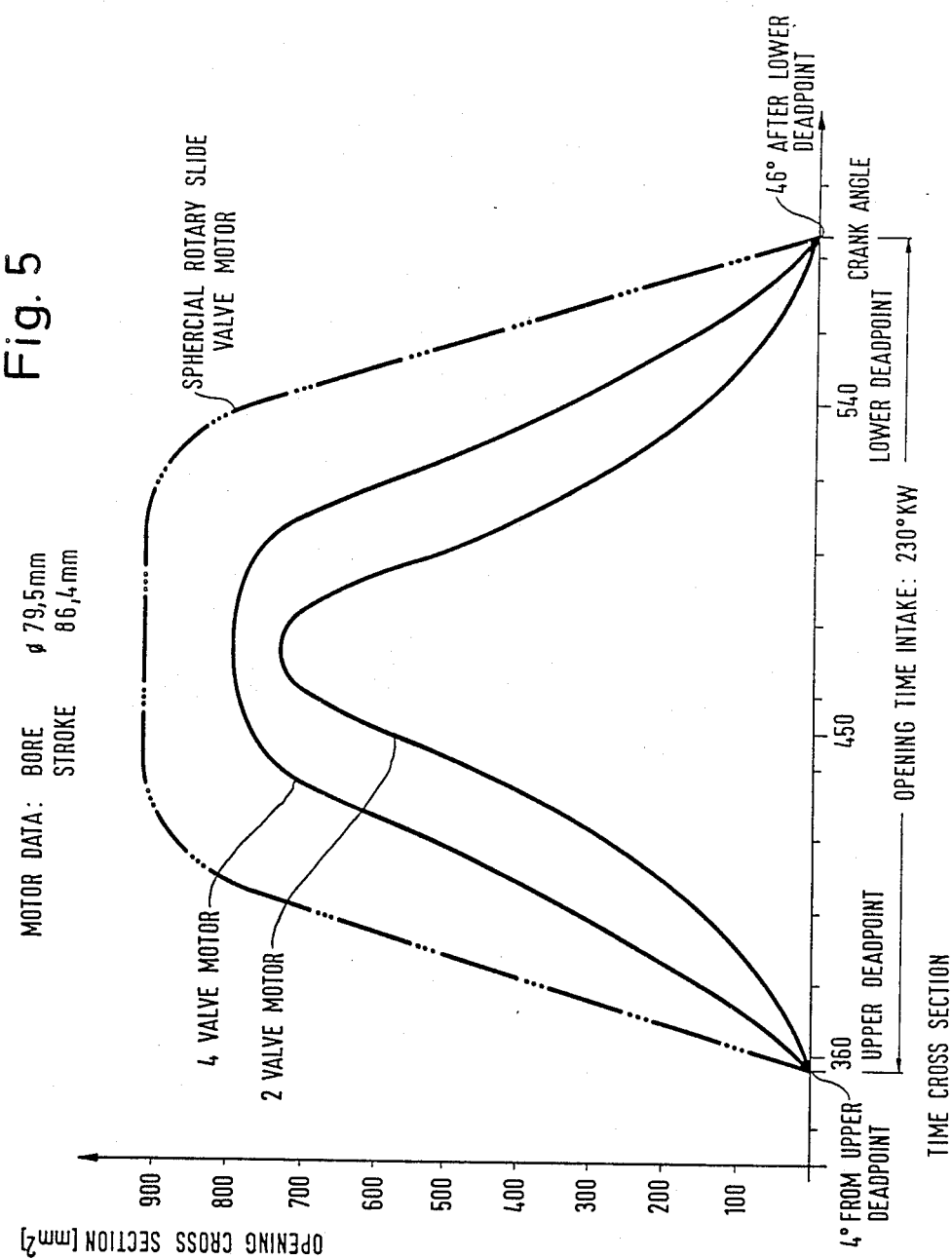
FIG. 5 a diagram relating to the opening cross sections in dependence on the crank angle of a motor with the spherical rotary slide valve of the invention in comparison with motors with a 2-valve control and with a 4-valve control.

From FIGS. 5 and 6 it is directly evident that the above-described spherical rotary slide valve is superior in respect to the opening and time cross sections both to a usual 2-valve and also to a usual 4-motor; expressed in percentages its opening behavior is 108 to 226% better than in a comparable 2-valve motor, with respect in each case to the same cylinder bore.

As is well known, the theoretical maximum valve opening cross section is the cylinder bore cross section, here an $\phi$ of 79.5 mm therefore=4960 mm$^2$. Over the valves, however, there is opened in each case only a partial cross section. The ratios between cylinder bore cross section and the individual valve cross sections of the individual motor types chosen are:

|  | Valve opening cross section / Cylinder bore cross section |
| --- | --- |
| 2-valve motor | $\frac{731 \text{ mm}^2}{4960 \text{ mm}^2} = 0.15$ |
| 4-valve motor | $\frac{790 \text{ mm}^2}{4960 \text{ mm}^2} = 0.16$ |
| Spherical rotary slide valve motor | $\frac{920 \text{ mm}^2}{4960 \text{ mm}^2} = 0.19$ |

I.e., the spherical rotary slide valve is capable with the aid of its design, in the case of a given motor with a certain cylinder bore of achieving a greater valve opening cross section as compared to other valve control systems, as the above representation proves.

It is desirectly understandable that the spherical rotary slide valve is usable both in connection with four-stroke and also in connection with two-stroke internal combustion motors with corresponding modification of the gas channels.

The spherical rotary slide valve can be constructed in one part or in several parts, as described at the outset, as well as consist of ceramic or even of compound materials, according to the requirements of the particular field of application.

The spherical rotary slide valve may, further, be part of a one-cylinder or multicylinder motor, its area of application, therefore, is not restricted to the construction described. Other forms of construction, too, of the piston and of the cylinder cover are possible in correspondence to the particular requirements of the configuration to be chosen of the combustion chamber, without the thought of the invention hereby being abandoned. It is especially to be heeded that it is usable also for in-line motors without its being necessary to alter the other components. There it is provided that over each cylinder there is arranged a spherical rotary slide valve the axis of rotation of which extends transversely to the array direction of the cylinders. There is to be achieved a structure height that lies lower than in the case of plate valves. Moreover, a spatial form of the combustion chamber can be developed that approaches the optimum. The sealing is arranged in the cup surface 27 and needs, therefore, to consist only of a simple ring 33, 33a, 33b. There is yielded, therefore, a very simple sealing element. Neither complicated sealing ring forms nor sealing sleeves are required. A special step is shifting the bearing of the spherical body to the bearing pivots and not to the spherical surface as was the case, for example with the known roller slide valves with the roller surface. There can even be provided a gap between spherical surface and cup surface 25, 27, which does not have to be filled with an oil film.

A further-going form of execution of the spherical rotary slide valve of the invention is shown in FIGS. 7 and 8. Insofar as there are present structurally like spatial forms with the embodiment according to FIGS. 1 to 6, the components are marked with the same reference numbers.

The form of execution according to FIGS. 7 and 8 presents, like that of FIG. 2b, a two-part cylinder cover 13. The sealing ring 33b is seated in an annular groove 97, which is introduced into the cup surface 27 of the lower part 93 of the cylinder cover. The sealing ring consists of a carbon or graphite ring 98 and lies against the spherical surface. It is firmly borne in a metal ring 99 which is supported against the bottom of the annular groove 97 with a spring element 100. The spherical rotary slide valve 15 is made, for example, of a suitable ceramic material and presents on one side, namely gas outlet side, a cooling channel 57, which surrounds the gas channel 47 and traverses the remaining hollow space of the sphere. The cooling channel 57 is formed, accordingly, by the cylinder annular space surrounding the gas channel 47 in the bearing pivot 44 and the remaining spherical hollow space. There is achieved with this cooling channel arrangement an optimal cooling of the spherical rotary slide valve. On the gas intake side the bearing pivot 43 and the gas channel 46 form a unit, i.e., there not provided any separate cylinder annular channel for the coolant.

The axial bearing of the spherical rotary slide valve is assured in this embodiment of the invention by an axial bearing 101 which lies on one side on the gear wheel 64a and on the other side presses against an annular edge 103 in the flange cap 21. The drive of the spherical rotary slide valve is transferred over a screw wheel 102, the pitch of which presses the spherical rotary slide valve against the cap edge 103.

Radial shaft seals 104 and slide ring seals 105 seal the bearing pivot surfaces of the spherical rotary slide valve against the bearing surfaces. Moreover, there is arranged a pump wheel 106 inside the flange cap 22 on the bearing pivot 44, which wheel drives the coolant through the cooling channel 57. Furthermore, there are accommodated further cooling channels 107 in the cylinder head cover part, so that not only the rotary slide valve body, but also the entire cylinder head can be otpimally cooled.

There is perceived in FIG. 7 a gap space 108 between the spherical surface and the cup surfaces 25 and 27, which can be present with the spherical rotary slide valve of the invention and does not need to be filled with oil. By this free gap space 108 there is assured an especially low-frictional running of the spherical rotary slide valve. The providing of such a gap space 108 is for the first time possible in the rotary slide valve of the invention, because the support of the spherical rotary slide valve was shifted to the bearing pivots 46 and 47 and the slide valve body surface or spherical surface is not longer needed for the support of the slide valve. Over the gap space 108 in the zone of the cup surface 27 the pressure from the cylinder can pass into the groove 97 and press the sealing ring 33b in arrow direction 109 (FIG. 8) against the spherical surface.

From FIG. 8 it is evident that the entire hollow sphere except for the wall parts of the channels 46 and 47 contributes to the cooling channel 57.

According to a special form of execution of the invention, in the region of a plane that passes through the center of the sphere there is provided a spacing between the outer walls of the elbow parts of the gas channels 46 and 47. This interspace is penetrated by a spark plug 110 on a diametral line. According to the invention the spark plug 110, therefore, is arranged in the slide valve body turning with a uniform angular velocity.

The spark plug arrangement of the invention presents an electrically conducting spark plug inset ring 11 with a ground electrode 113, in the interior of which there are arranged first an insulating body 114 and therein a middle electrode 112. This inset ring 11 is screwed into a metal tube 115, which passes through the sphere on the diameter line and is welded airtightly with the sphere shell at the exits 116 of the sphere of metal. In the tube 115 there is present axially or centrally an ignition line 117 which is embedded in an envelope 118 of electrically insulating material. The ignition line 117 ends at the end lying opposite the inset 111 on the surface of the spherical body in a slide shoe (not represented) and stands at the other end in contact with the middle electrode 112.

In the cylinder head upper part 13, 92 there is screwed with a thread an ignition current transfer part 119. It consists likewise of a central ignition line, an insulating body around it and a casing 120. The casing 120 is dimensioned in such a way that by rotating of the spherical rotary slide valve body through 180° into the overlapping upper deadpoint the spark plug insert 111 becomes visible and without disassembling of the cylinder head it can be changed.

To the ignition current transfer part 119 there can be connected a commercially usual ignition installation 121.

In order to achieve a faultless current flow from the turnable spherical slide valve 15 to the stationary components 11, 11a, 13, 92, and this is possible over the slide bearing 88 and 89 only with increased electrical resistance (oil film in the slide bearings, there is arranged a slip ring 123 on the flange ring 65 or on the flange ring 63 (FIG. 1). A brush 122 fixed on stationary side makes possible the necessary current flux, similarly as in the case of a collector in an electric motor.

The spark plug arrangement of the invention yields the possibility of positioning the spark plug at the most favorable place of the combustion chamber 95, for example in the middle of the upper boundary surface of the ignition chamber in the cylinder axis. The combustion course can be optimated. The combustion changer environment is simpler to form spatially because of the absence of the spark plug installation and can be optimally cooled.

The spark plug arrangement of the invention can also be provided in other rotary bodies, for example in a roller and is not restricted to the arrangement in the sphere. Nevertheless it is especially suitably accommodated there.

The use of a sphere as control body yields unexpected advantages. Simple components can be used, so that the manufacture becomes economical. The rotationally symmetric components of the spherical rotary slide valve present no local material accumulations, so that through the action of temperature changes and differing thermal burdening no deformation of the control body can occur. The spatial form of the spherical rotary slide valve remains uniform. The sealing ring pressing against the spherical surface may consist of different materials, for example also ceramic, because the control body undergoes no dimensional changes. By slightly inclined bearing it can execute a rotation about its center and thereby assure the sealing effect over a long period of time.

With the spherical rotary slide valve it is possible to dispense with an additional lubrication, since the spherical surface lies only against the sealing edge of the sealing ring. There is even provided a gap between spherical surface and counter-surfaces in the cylinder head, which can amount to about 0.2 to 0.08 mm. The control body and the sealing ring may consist, for example, of ceramic materials. A sphere consist of metal may, however, also be coated with ceramic materials, for example by plasma spraying. These forms of execution are possible because a lubrication is not required.

The spherical rotary slide valve arrangement of the invention can be optimally cooled, because the spatial forms of the components are simple. Mass accumulations are absent. This favors the production of the parts from ceramic materials. The pressure force introduction in the compression process is extremely favorable in the sphere by reason of the dome form. The production of the spherical form is especially simple and problem-free as compared to a cylindrical form.

The bearing of the spherical rotary slide valve on the bearing pivots is possible, because the bearing pivots are not exposed to any appreciable temperature changes and consequently undergo no spatial form change through action of heat. The lubrication of the bearings is for this reason also free of of problems.

In particular, however, it is to be stressed that in the installation of the spark plug in the cavity of the sphere a combustion chamber formation can be assured that could not be more optimal. From this it results that very high performances of the motor are attainable. The ignition can occur on the cylinder axis, whereby the flame front sets in circularly. By reason of the circular side wall ring in the cylinder it reaches its conclusion in all points at the same time.

The combustion chamber can be kept very small, especially if the surface of the piston is constructed in cup form and the radius of the cup form is adapted to the radius of the sphere.

A further advantage is yielded from the cool combustion chamber walls, since both the side wall ring and also the rotary slide valve sphere can be intensively cooled with a suitable coolant. Furthermore, in contrast to the valve motor, there are absent the hot exhaust gas valves. By reason of this absence of hot places in the combustion chamber there is attainable a substantially higher compression ratio and therewith a higher motor performance.

In the spherical rotary slide valve of the invention there is arranged for the first time a spark plug inside the control body. It can be arranged, therefore, centrally over the middle of the combustion chamber. As the spark plug undergoes an intensive cooling, it no longer presents a hot place in the combustion chamber. It is present only briefly in the combustion chamber and thus cannot heat up substantially.

The sealing ring may be tilted out of the plane parallel to the axis of rotation of the rotary slide valve and through different spherical section circumferences generate relative velocity differences on the sealing edge between rotary slide valve sphere and sealing ring and thereby make possible a rotation 119 of the seal about its axis of rotation, which leads to an increased useful life and sealing capacity of the seal.

The sealing ring can act, furthermore, with different spring forces on the rotary slide valve sphere on the regions nearest the rotary valve sphere bearings, which bring about a circumferential force difference on the sealing edge between rotary slide valve sphere and sealing ring and thus a rotation 119 of the sealing about its axis of rotation, which likewise leads of an increased useful life and sealability of the seal.

The internal combustion motor can be executed as an Otto, diesel or gas motor.

We claim:

1. Internal combustion motor, in particular a lift-piston motor with internal combustion and with cylinders arranged in-line, as well as with at least one rotating control element for the gas charge change processes which is arranged between cylinder block and cylinder cover of cylinder head with an axis of rotation lying perpendicular to the cylinder axis and presents between two rotational-axially extending pivots a control body standing in fixed connection with the pivots, there being provided in the cylinder head counter-surfaces uniformly surrounding the control body and the pivots, and each pivot being traversed by an axially extending gas channel, which in each case goes over into an elbow-form gas control channel arranged in the control body, which channel emerges with an opening at the surface of the control body, and means being provided for the transfer of a rotary movement from the crankshaft to the control element, characterized in that:

the control body comprises a spherical rotary slide valve (15) consisting of two hemispherical shell-shaped parts (40 and 41) welded together gas-tight;

said parts (40 and 41) supplementing each other to provide a hollow sphere having an equatorially arranged separating seam (39);

the pivots being tubular bearing pivots (43 and 44 welded centrally onto opposite sides of said hollow sphere;

the two elbow-form channels (46 and 47) penetrate said separating seam (39) of said hollow sphere at a predetermined control angle;

one end (48 and 49) of each channel (46 and 47) issuing in closed linkage into associated one of openings (50 and 51) of the parts (40 and 41); and the other end (53 and 54) of each channel (46 and 47) penetrating an associated one of said tubular bearing pivots (43 and 44) coaxially with each other to provide cooling channels (56 and 57) adjacent to said other ends (53 and 54) and bounded by outer mantle surfaces of said control channels (46 and 47) and inner mantle surfaces of said bearing pivots (43 and 44).

2. Internal combustion motor according to claim 1, characterized in that the pivots (43, 44) are borne in the cylinder head, and that in the cylinder head there are arranged cup-shaped counter-surfaces (25, 27) surrounding the control body (15), in which system in the cup surface (27) adjacent to the cylinder there is borne a sealing ring (33, 33a, 33b) preferably turnable about its axis which lies against the surface of the hollow sphere (15) and seals the combustion chamber (95) of the cylinder (11) against the outer space.

3. Internal combustion motor according to claim 1, characterized in that the cylinder head is divided in two perpendicularly to the cylinder axis and the division runs through the rotation axis (90) of the rotary slide valve (15).

4. Internal combustion motor according to claim 1, characterized in that in the cylinder head with the exception of the entry zones of the pivots (43, 45) on cylinder cover side there is provided a cup-shaped or spherical dome-shaped counter-surface (25) and on cylinder bore side in the cylinder head (12) with the exception of the entry zones of the bearing pivots (43, 44) and the cylinder bore there is arranged a spherical dome-shaped counter-surface (27).

5. Internal combustion motor according to claim 1 characterized in that in the cylinder block (11) there are introduced cooling channels (23).

6. Internal combustion motor according to claim 3 characterized in that flange caps (21, 22) are placed on the cylinder head (12) which cover the bearing places for the slide valve (15) which are arranged between the cylinder cover (13) and the cylinder block (11).

7. Internal combustion motor according to claim 1, characterized in that a piston (17) has a face surface (28) constructed in spherical shell segment form.

8. Internal combustion motor according to claim 1, characterized in that in the face surface (28) of the piston (17) there is introduced a radially extending groove (29) into which there extend the electrodes of a spark plug (30) radially screwed in the cylinder block (11).

9. International combustion motor according to claim 8, characterized in that to the groove (29) there is allocated a cooling rib (31) lying inside the piston skirt.

10. Internal combustion motor according to claim 4 characterized in that on both sides with equal spacing beside the center of the sphere (15) there is borne in each case a sealing ring section (34) in a groove in the spherical dome surface (25 and 27), and that the sealing strips (34) extend perpendicular to the axis of rotation (90) of the spherical rotary slide valve (15) an impage vertically on the plane of the sealing ring (33).

11. Internal combustion motor according to claim 7, characterized in that the piston (17) presents a rotationally symmetric formation of its face surface (28).

12. Internal combustion motor according to claim 1, characterized in that the cross sections of the zones of the control channels (46) issuing in the openings (50 and 51) are formed about rectangularly and the cross section of the zones of the control channels issuing in the tubular bearing pivots (43) is formed circularly.

13. Internal combustion motor according to claim 1, characterized in that the bearing pivot (43) presents on its free end away from the sphere a radially extending ring (60) and the bearing pivot (44) on the corresponding end presents a radially extending ring (61), with which in each case the allocated of the control channels and 47) are welded gas-tight, and that the ends (48 and 49) are welded gas-tight in each case in the openings (51 and 52) of the parts (40 and 41).

14. Internal combustion motor according to claim 1 characterized in that the bearing pivot (43) has on its outer mantle surface an annular projection (63) extending radially outward in the manner of a flange ring with a gear rim (46) fastened to it with radially extending teeth, which gear rim is arranged outside the bearing opening (81), which rim is connected with drive means, and that the outer mantle surface of the other bearing pivot (44) has a radially extending annular projection (65) which is arranged outside the bearing opening (79) and lies, conditioned by the drive with a slide ring or the like on the face surface of the cylinder cover (13) and of the cylinder block (11)

15. Internal combustion motor according claim 1 characterized in that the two bearing pivots (43, 44) are traversed radially by at least one bore (67 or 68), so that the cooling channels (56 and 57) communicate over these bores with a coolant-conducting channel (71) and with a coolant-discharging channel (72).

16. Internal combustion motor according to claim 6 characterized in that the flange caps (21, 22) bear slide ring seals (75, 76, 77, 78).

17. Internal combustion motor according to claim 3 characterized in that the spherical rotary slide valve (15) is borne by means of its bearing pivots (43 and 44) in cylindrical bearing openings (79 and 81) which are provided expediently in each case half in the cylinder block (11) and half in the cylinder cover (13).

18. Internal combustion motor according to claim 1 characterized in that the cylinder cover (13) is contructed in two parts and presents a spherical cup-shaped cover upper part (92) and a spherical cup annular cover lower part (93).

19. Internal combustion motor according to claim 18, characterized in that the cover part (93) presents an inclined lateral threaded bore (94) into which the spark plug (30a) is screwed, which extends with its ignition electrodes into a combustion chamber (95a) present above the cylinder bore (26), and, namely, between the face surface (28b) of the piston (17) and the spherical rotary slide valve (15).

20. Internal combustion motor according to claim 4 characterized in that between the spherical surface and the spherical dome surfaces (25, 27) there is provided a gap (108) without oil film.

21. Internal combustion motor according to claim 2 characterized in that the sealing ring (33b) is seated in an annular groove (97) preferably inclined to the cylinder axis, which is introduced into the cup surface (27) of the cylinder cover lower part (93).

22. Internal combustion motor according to claim 21, characterized in that the sealing ring (33b) consists of heat-resistant materials with good sliding properties, is admitted into a supporting body (99) in such a way that it lies both against the spherical surface and also in the annular groove (97) arranged obliquely to the cylinder axis, is supported over spring elements (100) and can rotate about its own axis.

23. Internal combustion motor according to claim 1 characterized in that the spherical rotary slide valve consists of ceramic material.

24. Internal combustion motor according to claim 23, characterized in that the spherical rotary slide valve (15) has exclusively on gas-outlet side said cooling channel (57) that surrounds the gas channel (47) and passes through the remaining hollow space of the sphere, the bearing pivot (43) and the gas channel (46) forming a unit.

25. Internal combustion motor according to claim 6, characterized in that the axial bearing of the spherical rotary slide valve (15) is assured by an axial bearing (101) that lies on one side on the gear wheel (64a) and on the other side presses against an annular edge (103) in the flange cap (21).

26. Internal combustion motor according to claim 25, characterized in that the drive of the spherical slide valve (15) is transferred over a worm wheel (102) the pitch of which presses the spherical rotary slide valve against the cap edge (103).

27. Internal combustion motor according claim 25 characterized in that a pump wheel (106) is arranged inside the flange cap (22) on the bearing pivot (44), which drives the coolant through the cooling channel (57).

28. Internal combustion motor in particular claim 8 characterized in that the spark plug is arranged in the slide valve body turning with uniform angular velocity.

29. Internal combustion motor according to claim 28, characterized in that in the zone of a plane that passes through the center of the sphere there is provided between the outer walls of the elbow parts of the gas channels (46 and 47) a spacing that creates an interspace which is penetrated by a spark plug (110) on a diametral line.

30. Internal combustion motor according to claim 29, characterized in that the spark plug system presents an electrically conducting spark plug inset ring (111) with a ground electrode (113) in the interior of which there are arranged first an insulating body (114) and in it a middle electrode (112), the inset ring (111) being screwed into a metal tube (115) that passes through the sphere on the diametral line and is welded air-tightly with the spherical shell at the respective exits (116) of the metal sphere, and in which in the tube (115) there is present axially or centrally an ignition line (117) which is embedded in an envelope (118) of electrically insulating material, and in which the ignition line (17) ends at the end lying opposite the inset (111) on the surface of the hollow sphere in a slide shoe and stands at the other end in contact with the middle electrode (112).

31. Internal combustion motor according to claim 30, characterized in that in the cylinder head upper part (13, 92) there is screwed with a thread an ignition current transfer part (119) which consists of a central ignition line, an insulating body around it and a casing (120).

32. Internal combustion motor according to claim 30, characterized in that from the turnable spherical slide valve (15) to the stationary components (11, 11a, 13, 92) there is arranged a slip ring (123) on the flange ring (65) or on the flange ring (63), and that there is provided a brush (112) fastened on stationary side lying opposite the slip ring (123).

33. Internal combustion motor according to claim 8 characterized in that the spark plug during the upper deadpoint is arranged in the middle of the combustion chamber (95) on its upper boundary surface.

34. Internal combustion motor according claim 8 characterized in that the spark plug is arranged in the cooling space of the sphere (15).

35. Internal combustion motor according to claim 1, characterized in that it has several cylinders at its disposal and over each cylinder there is arranged a spherical rotary slide valve.

36. Internal combustion motor according to claim 35, characterized in that the cylinder are arranged in a row and the axis of rotation of the spherical rotary slide valve is arranged transversely to the array direction of the cylinders.

37. Internal combustion motor according to claim 36, characterized in that axis of rotation of the spherical rotary slide valve is arranged perpendicularly to the cylinder axis.

* * * * *